CODING DEVICE

Filed Aug. 10, 1966

INVENTORS,
ANTHONY V. CAMPI
ROBERT E. CHAPMAN
BRUCE H. GRAY.

BY Harry M. Saragovitz, Edward J. Kelly, Herbert Berl & Julian C. Keppler
ATTORNEYS United States Patent Office
3,451,044
Patented June 17, 1969

3,451,044
CODING DEVICE

Anthony V. Campi, West Long Branch, Robert E. Chapman, Eatontown, and Bruce H. Gray, New Shrewsbury, N.J., assignors to the United States of America as represented by the Secretary of the Army Filed Aug. 10, 1966, Ser. No. 571,961
Int. Cl. G11b *13/00;* G06f *1/00, 7/00*
U.S. Cl. 340—172.5 7 Claims

ABSTRACT OF THE DISCLOSURE

An automatic data processor having a plurality of output flag bit cells connected to a coding device which includes a plurality of magnetic storage cells capable of transferring information from one cell to another. The cells are coupled to conductive straps which perform the transferring operation in the form of a binary matrix. The cells are also coupled to a register via a plurality of AND gates which are selectively enabled. As information is transferred from the flag bit cells through the magnetic storage cells the address of the flag bit locations is generated in the register.

The present invention relates to a coding device and more particularly to a device for resolving the address of information contained in an electronic memory.

In the field of content addressable memories, it has been the general practice to employ elaborate coding systems having large numbers of sense amplifiers and diodes connected in the form of a binary tree to perform the function of resolving the address of the flagged words. Although such devices have served the purpose, they are extremely expensive.

The general purpose of the present invention is to substantially reduce the number of sense amplifiers and diodes in an address resolver by utilizing the concept of "bit steering," i.e., reciprocally transferring digital information directly from one storage cell or location to another.

The exact nature of this invention as well as other objects and advantages thereof will be readily apparent from consideration of the following description of a preferred embodiment of the invention as illustrated in the accompanying sheet of drawing, in which.

Figure 1:
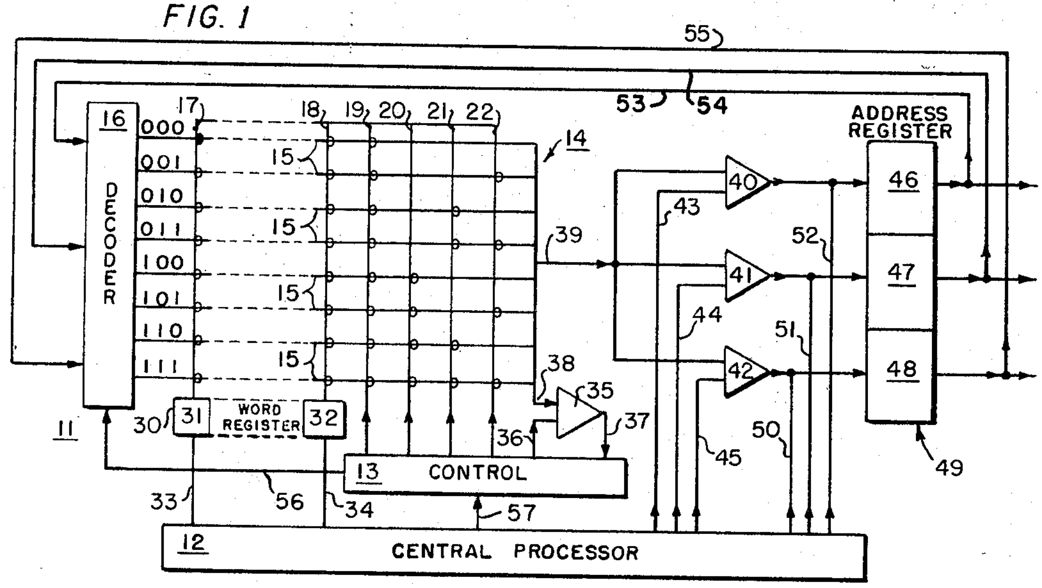
FIG. 1 shows a block diagram of a preferred embodiment of the present invention.

Referring now to the drawings, wherein like reference characters designate like or corresponding parts throughout several views, there is shown in FIG. 1 the invention as applied to a typical automatic data processor 11 having a central processor 12 coupled by a control 13 to a content addressable memory 14. It is to be understood that this particular arrangement is only one of many preferred embodiments and is chosen here for illustration because of its simplicity. The central processor 12, for example, may contain a memory similar to memory 14.

The memory consists of a plurality of similar magnetic storage elements 15 connected electrically in common at one end, and to a decoder 16 at the other end. Each element 15 is assigned a different address which is shown in FIG. 1 in binary form at the left end and above the associated elements 15.

A plurality of straps 17–22, similar to each other, are selectively coupled to elements 15 to form a matrix. The straps 17–22 provide a magnetic coupling to the elements 15 in those locations where the straps 17–22 are looped about the element 15. There is no magnetic coupling between the straps 17–22 and elements 15 where they merely cross.

Straps 17, 18 and 19 are illustrated as being magnetically coupled to all memory elements 15. Straps 20, 21 and 22 are each coupled to only four elements 15 at selective locations to form a binary matrix. Strap 20 is coupled to elements 15 at addresses 100, 101, 110 and 111. Strap 21 is coupled to the elements 15 at address 010, 011, 110, and 111. Strap 22 is coupled to the elements 15 as address 001, 011, 101, and 111.

Figure 2:
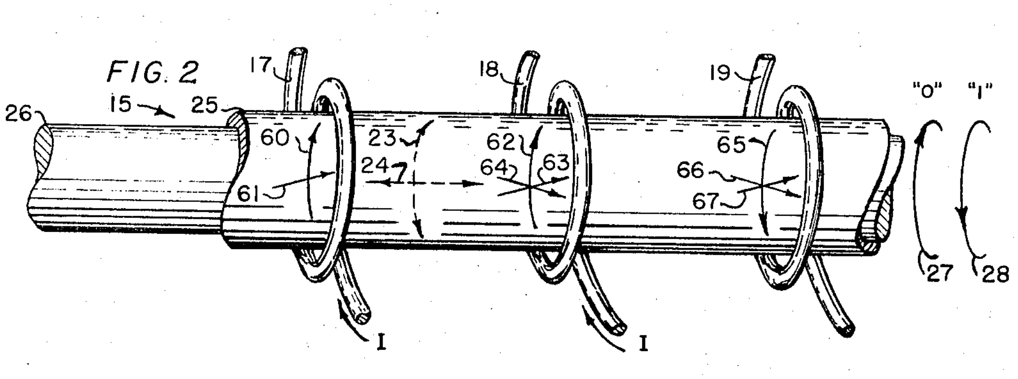
FIG. 2 shows, in greater detail, a portion of the device shown in FIG. 1.

The information in the memory 14 is contained in the memory elements 15 and is determined by the state or direction of the magnetization of a thin magnetic film 25 (FIG. 2) at the various locations where straps 17 and 18 are magnetically coupled thereto. Each of these locations constitute a memory cell. The magnetic film 25 plates an electric conductor 26 which may be, for example, a 5 mil beryllium copper wire. The magnetic film 25 is applied to wire 26 such that film 25 retains a circumferential easy axis of magnetization, represented by arrow 23, and a longitudinal hard axis of magnetization as represented by arrow 24. The methods of making such films are well known as are the magnetic characteristics thereof. Briefly, the residual magnetization of the film 25 at each of the cell locations may normally be oriented in one of two directions along the circumferentially easy axis, i.e., either clockwise or counterclockwise. It is pointed out that the residual magnetization in one cell or location on the film 25 may assume a direction which is opposite to the direction at an adjacent cell or location. Each of the two directions of magnetization is used to represent a different one of the two binary digits, i.e., "1" and "0"; as designated in this example by the arrows 27 and 28 of FIG. 2. The state or direction of the residual magnetization at a particular location is established by the coincidence of electric currents on both the conductor 26 and the particular strap associated with that cell or location. For example, in FIG. 2 the coincidence of current pulses on conductor 26 and strap 19 will establish a given direction for the residual magnetization on film 25 at the memory cell or location immediately below strap 19. The particular direction of these current pulses will determine the particular direction the residual magnetization will assume when the pulses are removed. It is pointed out that any one of the pulses on the straps 17–22 or conductors 26 is not capable individually of changing the residual magnetization at a particular location; there must be a coincidence of two pulses—one on a strap and the other on a conductor.

The straps 17 and 18 represent respectively the first and last memory straps of the memory 14. The information contents of the memory 14 will be contained on elements 15 between the straps 17 and 18. There would normally be a large number of straps, at least equal in number to the number of bits in the memory words. The additional straps are not shown since they are similar to straps 17 and 18.

Straps 17 and 18 are coupled to the central processor 12 by a word register 30 having stages equal in number to the number of bits in the memory word. Stages 31 and 32 are connected to straps 17 and 18 respectively. Stages 31 and 32 are also connected to the central processor by lines 33 and 34 respectively. The remaining straps 19–22 are connected to the control 13. Control 13 is also connected to an AND gate 35 by lines 36 and 37. A line 38 is connected from the common ends of elements 15 to AND gate 35. The common end of elements 15 are also connected to the inputs of AND gates 40, 41, and 42 by line 39. Also connected to the inputs of AND gates 40, 41, and 42 is the central processor 12 via lines 43, 44, and 45 respectively. The outputs of gates 40, 41, and 42 are connected to stages 46, 47, and 48 of an address register 49. Lines 50, 51 and 52 connect the central processor 12 to the stages 46, 47, and 48 respectively. Stages 46, 47, and 48 are connected by lines 53, 54, and 55 respectively to the decoder 16. Control 13 is also connected to the decoder 16 by line 56. Line 57 connects the central processor 12 to the control 13.

The operation of the memory within an automatic data processing system will now be briefly described. The detailed structure of central processor 12, control 13, decoder 16, and registers 30 and 49 are not part of the present invention and may be any of the well known systems which are capable of being designed and programmed to perform the desired sequence of commands. For example, information is stored or written into a particular address in the memory 14 as follows: the central processor 12 places the desired word to be stored in the word register 30 over lines 33 and 34, the desired address in the address register 49 over lines 50, 51, and 52, and a "write" command over line 57 to control 13; the decoder 16 decodes the inputs on lines 53, 54, and 55 from address register 49; and control 13 triggers decoder 16 over line 56 to provide a current pulse on the conductor 26 of the element 15 at the particular address which was placed in register 49. Word register 30 will provide pulses on straps 17 and 18 in directions which correspond to the information contained therein. Now, with the proper memory element 15 energized and the direction of the currents on straps 17–18 energized in accordance with the word in register 30, the residual magnetizations of the energized element 15 at the cells or locations thereon are adjusted to conform to the word in register 30.

The information or memory word contained at a particular address may be read by detecting, with register 30, currents which may be induced on straps 17–18 by pulsing the proper memory element 15. It is well-known that currents may be induced on straps 17–22 by rotating the magnetic fields on elements 15. The residual magnetic vectors at the cell locations along a particular element 15 will normally be rotated out of the plane of the easy axis (a stable state) to some second plane (an unstable state) by a current pulse on the element 15 in question. The direction of rotation out of the easy axis will depend on the direction of the magnetization vector while in the plane of the easy axis, i.e., a "1" or a "0." Therefore, the direction of induced current on straps 17 and 18 will depend on the memory word and may be detected by register 30. This operation may be initiated by a command from processor 12 over lines 33 and 34 and a command applied over line 57 to control 13 which in turn will pulse decoder 16 over line 56. The decoder will then determine the address of the element 15 to be read by sensing lines 53, 54, and 55 leading from register 49. The address in register 49 has, of course, already been supplied by the processor 12 over lines 50, 51, and 52.

The memory 14 may also be searched in parallel to determine which of the elements 15 contain a word which meets some imposed criteria. For example, it may be desirable to search the memory 14 for those words which contain a "0" in the least significant bit, i.e., under strap 18. One of the ways in which this may be accomplished would be to have a reference strap coupled to all memory elements 15 and coupled to the register 30 as are the straps 17 and 18. For purposes of this example, strap 17 may be considered as the reference strap. The residual magnetization at all memory cells or locations under the reference strap or strap 17 would be directed in the same direction. Assume the direction to be as shown by the arrow 60 in FIG. 2. Also, assume that if a particular word in the memory does meet the criteria of the search, i.e., a "0" in the cell under strap 18, then that particular address will be flagged by changing the state of the magnetization in the associated flag bit cell under strap 19. The search operation would then proceed as follows: the processor 12 would transmit a search command over line 57 to control 13 and also place a "0" in stages 31 and 32 of register 30 via lines 33 and 34. Straps 17 and 18 would then be pulsed by register 30, both in the same direction. If we assume the current in straps 17 and 18 as pulsed up as indicated by the arrow I, then the magnetization on film 25 under strap 17 would then be rotated clockwise from the initial stable direction as indicated by arrow 60 to the unstable position indicated by arrow 61. Likewise the magnetization under strap 18 would also be rotated clockwise from the stable position 62 to the unstable position 63, if there was a "0" at that location. If however, there was a "1" stored under a particular stage 18, i.e., the magnetization was directed opposite to the direction indicated by arrow 62, then the magnetization would be rotated counterclockwise to the unstable position indicated by arrow 64. Now, after the current pulses on straps 17 and 18 are removed, the magnetization vectors or the arrows 61 and 63 or 64 will proceed to rotate back to their original stable position, i.e., the position indicated by the arrows 60, 62, and the opposite of 62 respectively. These rotating vectors will induce currents on the associated conductors 26. For those locations or addresses where a "0" was stored under strap 18, the currents induced on conductor 26 by the rotating vectors under straps 17 and 18 will be in the same direction and become cumulative. However, for those addresses which contained a "1" under strap 18 the currents induced on conductor 26 by the rotating vectors under straps 17 and 18 will oppose each other and cancel.

As the vectors are rotating back to their stable states the strap 19 is pulsed. For those elements 15 where there was a match, and therefore an induced current on the associated conductor 26, the magnetization vector 65 will be reversed because of the coincidence of currents directed properly on both the conductor 26 and the strap 19. For example, the pulse on strap 19 will rotate arrow 65 to the position represented by arrow 66. If there is a net current pulse induced on the particular conductor 26 by the rotating vectors under straps 17 and 18, then the associated vector 66 will be rotated even further to the position represented by vector 67. When all currents cease, the vectors in unstable position 66 will return to the stable position 65, while the vectors in unstable position 67 will assume the stable position which is opposite to vector 65. Those elements 15 which have been vectors positioned in a direction opposite to vector 65 are now considered to be "flagged."

By using these flag bits contained in the cell location under strap 19 and the reference bits under strap 17, currents can now be selectively induced in those conductors 26 which are located at addresses which contain a matched or "flagged" word. These induced currents plus pulses generated by register 30 on the memory straps such as strap 18 may be used to selectively operate on only those words of the memory which either met or did not meet the criteria of the previously searched external word.

It is also important that such systems be capable of resolving the addresses of those words which were flagged as a result of a particular search. The addresses of the flagged words may now be generated in the present system in address register 49 by using the binary tree formed by straps 20, 21, and 22 and a process generally referred to as "bit steering." Bit steering may be regarded as the process of transferring the information contained in one memory location to a second memory location while still maintaining the original information at the first mentioned memory location. In effect, the establishing of a "0" in the flag bit locations under strap 19 in those location where there is a "0" in the memory locations under strap 18, which has just been explained, is an example of bit steering, i.e., the information under strap 18 ("0") has just been transferred to the location under strap 19 ("0") while still retaining the information ("0") under strap 18.

Figure 3:
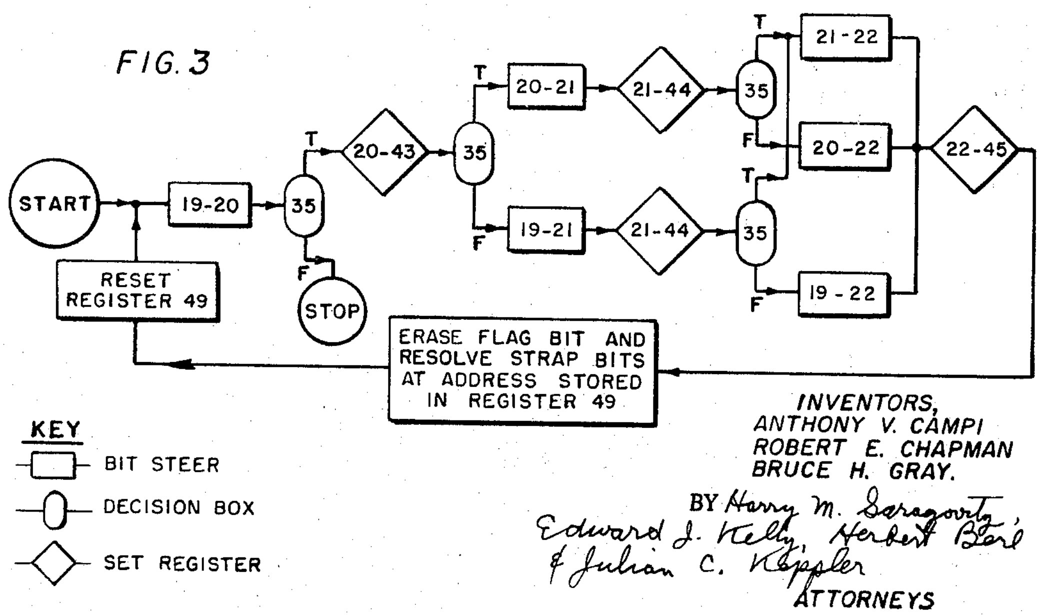
FIG. 3 shows a flow diagram.

Resolving the addresses of the flagged words is carried out by the processor 12 and control 13 which here again may be designed in well-known configurations to operate on the memory 14 in accordance with the flow diagram in FIG. 3. The rectangular boxes in FIG. 3 indicate the "bit steering" operation and the numerals in the box indicate the two strap locations which take part in the steering operation. For example, the first rectangular box after START indicates that the information under strap 19 is bit steered to the location under strap 20. The oblong boxes represent the decision operation performed by gate 35, i.e., "is there a true output on line 38 as the operation designated by the previous box is being performed?" For example, the first oblong box after START indicates that line 36 is pulsed true as information is being steered from strap 19 to strap 20 and that control 13 will detect the signal on line 37. If line 38 does not go true (none of the words in the memory 14 were flagged) then line 37 will be false and the resolve operation will end. If, however, line 37 goes true the next operation will be performed on memory 14 by proceeding to the next box.

The diamond boxes represent a resolve operation in which information, contained in the cell located under the strap indicated by the first numeral in the box, is detected by pulsing the strap, while the line indicated by the second numeral in the box is pulsed. For example, the first diamond box after START indicates that strap 43 is pulsed as the information under strap 20 is detected, i.e., strap 20 is pulsed, the magnetic vector is rotated to an unstable position, and a current in a particular direction will be induced on conductor 26 as the vector returns to the nearest stable position.

Assume that the word at address "101" is flagged and that the words at addresses "110" and "111" are not. The central processor 13, to resolve the address of this flag bit would proceed according to FIG. 3 as follows. Steer the information under the flag bit strap 19 to the location under strap 20. Since strap 20 is coupled to element 15 at address "101," and the word at this address is flagged, then under strap 20 there will be a "1" written at the address "101" as a result of steering. Gate 35 will have detected the bit steering current and upon pulsing line 36 signaled the control 13 to proceed with the resolve. Lines 20 and 43 are then pulsed simultaneously, and since under strap 20 there is a cell which contains a "1," then there will be an output on line 39 which together with the pulse on line 43 will write a "1" in stage 46 of register 49. There will also be an output on line 38 which together with a pulse on line 36 will indicate to control 13 via gate 35 and line 37 the next operation as indicated by the flow diagram of FIG. 3. The next operation is to steer the information contained under strap 20 to strap 21. Since strap 21 is not coupled to the element 15 at address "101," and since address "110" and "111" were assumed not flagged, then none of the elements 15 at the location under strap 21 will be changed from a "0" to a "1." The next operation is to pulse both lines 21 and 44. Since there are all "0's" under strap 21 there will be false outputs on lines 38 and 39. Therefore, stage 47 will not be altered and retain a "0" and control 13 will, after pulsing line 36, be signaled to proceed to the next operation according to the flow diagram of FIG. 3.

The next operation is to steer the information contained under strap 20 to strap 22. The element 15 at address "101" will now contain a "1" in the cell under strap 22. Strap 22 and line 45 will be pulsed and a "1" will be written in stage 48 of register 49. The resolve operation of the flag bit at address "101" is now complete and the address register 49 contains the address "101" which can be read at the outputs on lines 53 54, and 55.

To complete the resolve operation for the remaining flagged words, if any, the control 13 will erase the "1's" at address "101" under straps 19, 20, and 22 and proceed as described above until all flagged addresses have been resolved.

Obviously many modifications and variations of the present invention are possible in the light of the above teachings. It is therefore to be understood, that within the scope of the appended claims, the invention may be practiced otherwise than as specifically described.

What is claimed is:

1. An automatic data processor comprising a coding device having a pluarlity of magnetic storage cells; each said cell having at least two stable states of residual magnetic polarization; said cells being divided into a plurality of groups; each said group having a biasing means magnetically coupled to all of the cells therein for rotating the magnetic polarizaton of the cells in said group through a predetermined angle; the first cell in each said group being magnetically coupled to one of a plurality of switching means; each of the remaining switching means each being coupled selectively to a different one of said remaining cells and to a different half of said groups in the form of a binary matrix; said switching means being capable of switching the residual magnetization from one of said stable states to the other of said stable states in only said cells which have been biased in a predetermined direction by said biasing means; and said switching means and said biasing means capable of being energized upon the rotating of the said residual magnetization in one of said cells coupled thereto.

2. The device according to claim 1 and wherein each of said groups of cells comprises a thin film of antisotropic magnetic material coated on an electrical conductor of said biasing means.

3. The device according to claim 1 and wherein said biasing means comprises an electrical conductor and said cells comprise a thin film of anisotropic material coating said conductor; said magnetic film having a circumferential easy axis of magnetization.

4. The device according to claim 1 and further including a memory means comprising a plurality of storage cells interconnected by a plurality of biasing and switching means magnetically coupled to said storage cells in the form of a matrix; said memory means being coupled to said coding means; means for writing, reading and searching information in said memory; register means connected to the output of said coding means for registering the address of the memory locations which have met the condition of a search.

5. The device according to claim 4 and wherein said biasing means comprises a thin electrical conductor and said storage cells comprise a thin film of anisotropic material coating said conductors.

6. The device according to claim 5 and wherein all of said biasing means are connected in common at one end thereof; said register means having a plurality of stages; each said stage having the output of an AND gate connected thereto, one of the inputs of said AND gate being connected to the common end of said biasing means;

and means connected to a second input of each said AND gate for sequentially energizing said AND gates in a predetermined fashion.

7. The device according to claim 6 and wherein the other ends of said biasing means are coupled to a decoder means; and the output of said register means being coupled to the input of said decoder means.

References Cited

UNITED STATES PATENTS

| | | | |
|---|---|---|---|
| 2,989,732 | 6/1961 | Young | 340—172.5 |
| 3,248,711 | 4/1966 | Lewin | 340—172.5 |
| 3,271,744 | 9/1966 | Petersen | 340—172.5 |
| 3,290,656 | 12/1966 | Lindquist | 340—172.5 |

OTHER REFERENCES

A Magnetic Associative Memory, J. R. Kiseda et al., IBM Journal, April 1961, pp. 106, 107 and 111–121.

ROBERT C. BAILEY, *Primary Examiner.*

JOHN P. VANDENBURG, *Assistant Examiner.*

U.S. Cl. X.R.

340—174